(12) United States Patent
Huelsen et al.

(10) Patent No.: US 12,715,370 B2
(45) Date of Patent: Aug. 25, 2026

(54) ROOF MODULE COMPRISING A ROOF OPENING SYSTEM AND A SENSOR MODULE

(71) Applicant: Webasto SE, Stockdorf (DE)

(72) Inventors: Michael Huelsen, Stockdorf (DE); Magnus Sviberg, Stockdorf (DE); Maximilian Ehrmann, Stockdorf (DE); Cédric Langlais, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 298 days.

(21) Appl. No.: 18/531,293

(22) Filed: Dec. 6, 2023

(65) Prior Publication Data

US 2024/0190360 A1 Jun. 13, 2024

(30) Foreign Application Priority Data

Dec. 7, 2022 (DE) ..................... 10 2022 132 500.8
Dec. 5, 2023 (DE) ..................... 10 2023 133 979.6

(51) Int. Cl.
*B60R 11/04* (2006.01)
*B60J 7/02* (2006.01)
*G01S 13/931* (2020.01)

(52) U.S. Cl.
CPC ................. *B60R 11/04* (2013.01); *B60J 7/02* (2013.01); *G01S 13/931* (2013.01); *G01S 2013/93273* (2020.01)

(58) Field of Classification Search
CPC ... B60R 11/04; B60R 2011/004; B60R 11/00; B60R 2011/0092; B60R 2011/0094;
(Continued)

(56) References Cited

U.S. PATENT DOCUMENTS 9,963,018 B2 * 5/2018 Williams ................ B60R 11/04
10,099,630 B1 * 10/2018 Krishnan ............. G01S 13/931
(Continued)

FOREIGN PATENT DOCUMENTS

DE 202012101634 U1 5/2012
DE 102019122193 A1 2/2021
(Continued)

OTHER PUBLICATIONS

Office Action issued against corresponding German Application No. 10 2022 132 500.8; dated Sep. 19, 2023 in German with English machine translation ( 8 pages).

*Primary Examiner* — Bernarr E Gregory
(74) *Attorney, Agent, or Firm* — Fitch, Even, Tabin & Flannery, LLP

(57) ABSTRACT

A roof module for forming a vehicle roof on a motor vehicle comprises a panel component which at least partially forms a roof skin of the vehicle roof, the roof skin serving as an outer sealing surface, a roof opening system having a lid part configured to selectively open and/or close a roof opening, and at least one sensor module having at least one environment sensor. The sensor module is disposed on the roof module in such a manner that it at least partially protrudes in the direction of an opening center of the roof opening. The lid part comprises an indentation surrounding the at least partially protruding part of the sensor module when the lid part is closed, or the lid part at least partially covers the sensor module when the lid part is closed. A motor vehicle can have such a roof module.

19 Claims, 7 Drawing Sheets

(58) Field of Classification Search
CPC . B60J 7/02; B60J 7/043; G01S 13/931; G01S 2013/93273; B62D 25/06
See application file for complete search history.

(56) References Cited

U.S. PATENT DOCUMENTS

| | | | | |
|---|---|---|---|---|
| 2017/0305242 | A1* | 10/2017 | Gallagher | B60J 7/043 |
| 2017/0369106 | A1 | 12/2017 | Williams | |
| 2019/0003895 | A1* | 1/2019 | Krishnan | G01S 13/931 |
| 2019/0202371 | A1* | 7/2019 | Frederick | B60J 7/043 |
| 2019/0210436 | A1* | 7/2019 | Frederick | B60J 7/043 |
| 2021/0237694 | A1 | 8/2021 | Hirschvogel | |
| 2022/0169314 | A1 | 6/2022 | Huelsen | |
| 2022/0289006 | A1 | 9/2022 | Huelsen | |

FOREIGN PATENT DOCUMENTS

| | | | |
|---|---|---|---|
| DE | 102019122214 | A1 | 2/2021 |
| DE | 102020102643 | A1 | 8/2021 |
| DE | 102021123989 | B3 | 8/2022 |
| DE | 102021210409 | A1 | 3/2023 |
| EP | 3988357 | A1 | 4/2022 |

* cited by examiner

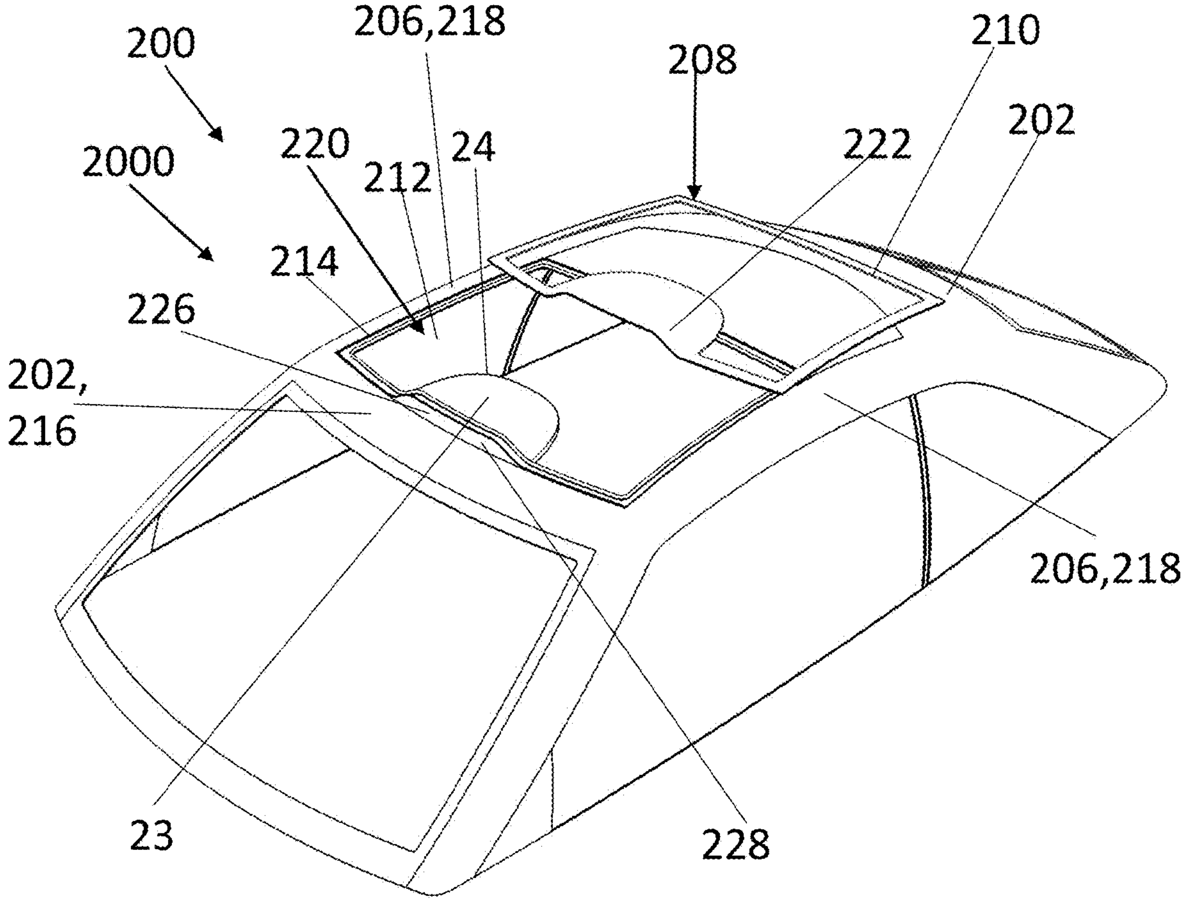
Fig. 5
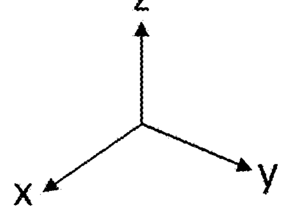

ROOF MODULE COMPRISING A ROOF OPENING SYSTEM AND A SENSOR MODULE

CROSS-REFERENCE TO RELATED APPLICATIONS

This application claims priority from German Patent Application Number 10 2022 132 500.8, filed on Dec. 7, 2022 and German Patent Application Number 10 2023 133 979.6, filed Dec. 5, 2023, which are hereby incorporated herein by reference in their entireties for all purposes.

FIELD

The invention relates to a roof module for forming a vehicle roof on a motor vehicle comprising a panel component which at least partially forms a roof skin of the vehicle roof, the roof skin serving as an outer sealing surface, a roof opening system having a lid part configured to selectively open and/or close a roof opening, and at least one sensor module having at least one environment sensor, the sensor module being disposed on the roof module in such a manner that it at least partially protrudes in the direction of an opening center of the roof opening. Furthermore, the invention relates to a motor vehicle comprising such a roof module.

BACKGROUND

Generic roof modules are used extensively in vehicle construction. For example, roof modules are prefabricated as separate functional modules and connected to a roof frame structure (which is part of the body structure) at the assembly line. The roof module at least partially forms a roof skin of the vehicle roof, which prevents moisture or air flows from entering the vehicle interior. The roof skin is formed by one or more panel components, which can be made of a stable material, such as painted metal or painted or solid-colored plastic. The roof module can be part of a rigid vehicle roof or part of an openable roof assembly, such as a sliding roof.

Furthermore, developments in vehicle construction are increasingly focusing on autonomously or semi-autonomously driving motor vehicles. In order to enable the vehicle control system to control the motor vehicle autonomously or semi-autonomously, a plurality of environment sensors (e.g., lidar sensors, radar sensors, (multi-)cameras, etc. including other (electrical) components) are used, which are integrated into the roof module, for example, and detect the environment surrounding the motor vehicle and determine, for example, a current traffic situation from the acquired environment data. Roof modules which are equipped with a plurality of environment sensors are also known as roof sensor modules (RSM). The known environment sensors send or receive electromagnetic signals, such as laser beams or radar beams, allowing a data model of the vehicle environment to be generated by signal evaluation and used to control the vehicle.

Environment sensors of this kind are disposed at least in the roof area of a motor vehicle, as a vehicle environment can be optimally viewed from such an elevated position.

The placement of an environment sensor, in particular in combination with other functional components, on a roof module generally requires a large amount of installation space. Due to the large number of components required, the installation space can often not be limited to the frame structures existing in the roof area but must be extended by providing additional mounting areas and/or installation space areas in relation to these frame structures. For example, in known roof modules, environment sensors are disposed in a front, in particular central, area of the vehicle roof and require increased installation space in an edge area behind the header of the vehicle roof.

If a roof opening system is provided, such an increased installation space requirement often means that the roof openings are smaller, as an edge area around the roof opening must be used as additional installation space. In the prior art, for example, the shape of sliding roofs is straight or slightly curved in a predetermined direction on each side. For instance, the shape of the front of a sliding roof is almost parallel to an (imaginary) line toward the upper edge of the windshield. However, a smaller roof opening often has a design disadvantage compared to large roof openings and may make the purchase of the vehicle in question less attractive to the customer.

SUMMARY

One object of the invention is to propose a roof module with an improved, in particular installation-space-optimized design which at least reduces the disadvantages of the known prior art described above.

This object is attained by a roof module in which the lid part comprises an indentation surrounding the at least partially protruding part of the sensor module when the lid part is closed, or the lid part at least partially covers the sensor module when the lid part is closed. Furthermore, the object is attained by a motor vehicle comprising at least one roof module according to the invention.

Advantageous embodiments of the invention are the subject matter of the dependent claims. In addition, all combinations of at least two features disclosed in the description, the claims and/or the figures fall within the scope of the invention. It is understood that the explanations made with respect to the roof module relate in an equivalent manner to a motor vehicle according to the invention without being mentioned separately for the latter. It is to be understood in particular that customary linguistic transformations and/or an analogous replacement of respective terms within the framework of customary linguistic practice, in particular the use of synonyms supported by the generally recognized linguistic literature, are comprised by the present disclosure without being explicitly mentioned in their respective formulations.

According to the invention, the roof module for forming a vehicle roof on a motor vehicle comprises a panel component which at least partially forms a roof skin of the vehicle roof, the roof skin serving as an outer sealing surface. The roof module further comprises a roof opening system, such as a sliding roof and/or a panoramic sliding roof, having a lid part. The roof opening system is configured to selectively open and/or close a roof opening. Preferably, the roof opening can be selectively covered or opened by the at least one lid part. The lid part is preferably partially transparent or transparent but can in principle also be non-transparent. The lid part can be made of glass or a plastic material or any other material, for example. Furthermore, the roof module comprises at least one sensor module having at least one environment sensor. The sensor module is disposed on the roof module in such a manner that it at least partially protrudes and/or sticks out and/or projects and/or juts out in the direction of an opening center of the roof opening. According to the invention, the lid part comprises at least one indentation which surrounds the at least partially protruding part of the sensor module, in particular at least partially, in particular laterally, when the lid part is closed, or the lid part at least partially, in particular fully, covers the sensor module, in particular at the top and/or laterally, when the lid part is closed.

The at least one environment sensor may be retractable and deployable. The at least one environment sensor is preferably disposed in an opening of the roof skin, in particular of the panel component, in a retractable and deployable manner and can preferably be moved between a retracted position and at least one deployed position relative to the panel component. The at least one environment sensor is preferably moved via a kinematic system, which may comprise a drive and/or a gear and/or an adjustment mechanism.

According to the invention, the roof module can be configured in such a manner that an installation space for the sensor module is widened or bulged in a longitudinal vehicle direction, in particular in a central area of the vehicle roof as viewed in a vehicle width direction. In this manner, additional installation space can be created for the sensor module. Preferably, a front-side and/or rear-side panel and/or a front-side and/or rear-side part of the panel component and/or a part of a motor vehicle body and/or a frame structure of the vehicle body and/or a frame structure of the roof module is widened, in particular partially, as viewed in the longitudinal vehicle direction. The edge area of the roof module therefore preferably does not comprise an installation space that essentially only runs in a straight line, but the installation space is at least partially widened or bulged in a surface cross section formed by the longitudinal vehicle direction and the vehicle width direction.

Correspondingly, the lid part may comprise a protrusion or a bump which covers the bulged area of the installation space laterally, in particular on three sides, and/or at the top at least partially, in particular fully, when the lid part is closed. In this manner, the roof opening can be as large as possible, since the lid part preferably protrudes only partially and/or locally. Unlike in the prior art, the lid part thus does not have a purely straight and/or only slightly bent or curved shape in this case, in particular when viewed in the vehicle width direction; instead, it preferably comprises at least one at least partially provided bump, as viewed along the shape.

Alternatively, the lid part may comprise an indentation which surrounds the bulging area of the installation space, at least when the lid part is closed. In this manner, the roof opening can be dimensioned as large as possible since the lid part is preferably only partially and/or locally trimmed or indented and thus reduced in size when viewed in the direction of a center of the roof opening. Unlike in the prior art, the lid part, viewed in particular in the vehicle width direction, thus does not comprise a purely straight and/or only slightly bent or curved shape in this case; instead, it preferably comprises at least one at least partially provided indentation, as viewed along the shape.

Preferably, the lid part moves along and/or about at least one axis of movement during opening and closing. The adjusting movement of the lid part can comprise a translational and/or rotational and/or a combined translational and rotational movement. Particularly preferably, the lid part, which is curved once or multiple times, in particular locally, moves along the longitudinal vehicle direction when opening and closing. Particularly preferably, the lid part, at least in the open position, forms a wind deflector which is at least partially indented in the area of a front edge of the lid part and which can be deployed by an opening movement of the lid part. A structure and/or a shape, in particular viewed in the direction of the roof opening center, of an indented front transverse line of the lid part preferably follows a bulging transverse shape of an edge area of the roof module designed as a mounting area or an installation space of the sensor module. Preferably, the lid part has sufficient rigidity despite the indentation or the protrusion.

The configuration of the lid part according to the invention, which preferably forms a front segment of the vehicle roof and/or a wind deflector, comprises the following advantages. The configuration according to the invention allows the installation space for the sensor module to be compact. In addition, a see-through area of the lid part and/or a cross-sectional area of the roof opening can be enlarged. This has a positive effect on the styling and a design of the roof module. The use of the lid part as a wind deflector can also provide protection for the interior of the motor vehicle. The modified shape of the lid part can also optimize a cleaning effect for cleaning the sensor module and/or the lid part due to improved aerodynamic effects.

Alternatively or in addition to the at least one environment sensor, the sensor module, which in other cases can also be referred to as a component module, can comprise at least one electronic and/or electrical and/or mechatronic and/or mechanical component. The component may comprise a computing unit and/or an evaluation unit and/or an antenna (or an antenna module) and/or a light source (or a light module) and/or electronics. “At least one” means that the roof module may comprise one or more than one of the component in question.

In a preferred embodiment, the roof module comprises a roof module frame with at least one transverse and/or longitudinal beam at least partially delimiting the roof opening at the edge. In a particularly preferred embodiment, the sensor module is disposed on or at least partially comprised by the roof module frame and/or the at least one transverse and/or longitudinal beam. The sensor module can also be attached to the roof module frame or to the transverse and/or longitudinal beam via a support, such as a mounting component. In its mounted state, the sensor module protrudes from the roof module frame and/or the transverse and/or longitudinal beam in the direction of the opening center, upward and/or downward and thus forms a local or partial bulge. The bulge is preferably formed in a cross-sectional area of the installation space in which the sensor module is disposed, said cross-sectional area being formed by the longitudinal vehicle direction and the vehicle width direction.

For example, the bulge protrudes in a direction opposite to the direction of travel, in particular when the sensor module is disposed at the front.

Alternatively or additionally, it is possible that the sensor module is disposed on the at least one transverse and/or longitudinal beam in such a manner that the sensor module and the at least one transverse and/or longitudinal beam protrude, in particular together, in the direction of the opening center; i.e., the at least one transverse and/or longitudinal beam preferably forms the bulge.

In a preferred embodiment, at least part of a mounting area of the sensor module projects from an edge area of the roof opening in such a manner that an opening cross section of the roof opening is reduced and/or tapered at least in sections or partially or locally in said area.

In a preferred embodiment, the indentation of the lid part is complementary, in particular in area, to the projecting part of the mounting area. In other words, in terms of area, the indentation in the lid part corresponds essentially, i.e., except for functionally necessary tolerances that are required for opening and closing the lid part, to the bulge that results from the installation space of the sensor module increased in the direction of the opening center. In the edge area in which the indented area of the lid part abuts the bulged mounting area of the sensor module when the lid part is closed, at least one set of weather strips is preferably provided to prevent moisture from entering an interior of the roof module. Alternatively, the indentation of the lid part can be at least geometrically similar to the projecting part of the mounting area.

In an exemplary embodiment, the protrusion of the lid part is complementary to the projecting part of the mounting area, in particular in terms of area. In other words, the protrusion in the lid part essentially corresponds in area to the bulge resulting from the fact that the installation space of the sensor module is enlarged in the direction of the opening center.

The geometry of the protrusion may correspond to the geometry of the sensor module.

At least one set of weather strips preventing moisture from entering an interior of the roof module may be disposed at the edge of the protrusion. Also, the protrusion of the lid part may be at least geometrically similar to the projecting part of the mounting area.

In a particularly preferred embodiment, the indentation of the lid part is formed by a localized material recess or material removal as viewed in a lid-part cross section. It is understood that a shape of the indentation can be modified and/or deviate from the bulge depending on the styling and/or the vehicle geometry.

In a preferred embodiment, the roof opening system comprises at least one roof opening kinematic mechanism and at least one guide rail in which the lid part is guided, in particular linearly, along the at least one guide rail to selectively open or close the roof opening. During an opening and/or closing movement, the lid part can also perform a rotating movement and/or tilting movement about at least one axis of rotation. Alternatively or additionally, the lid part can also be moved into a partially open position. Alternatively or additionally, the lid part can be moved into an inclined position and/or a tilted position.

In a preferred embodiment, the at least one environment sensor is configured to send and/or receive electromagnetic signals through a see-through area. Basically any type of electrical and/or electronic and/or electromagnetic and/or mechatronic and/or mechanical components can be (additionally) included in the sensor module. Preferably, the at least one electrical and/or electronic and/or electromagnetic and/or mechatronic and/or mechanical component comprises one or more antennas and/or an antenna module and/or a control unit and/or a light module and/or a light generator.

In a preferred embodiment, the at least one environment sensor comprises a lidar sensor and/or a radar sensor and/or a camera sensor and/or a multi-camera sensor and/or an ultrasonic sensor and/or rain sensors. Other sensor types not mentioned that can be used in the area of roof modules are also included here.

In an exemplary embodiment, a window is disposed in front of the see-through area of the at least one environment sensor between the lid part and the roof module frame, the at least one sensor module being capable of acquiring environment data through the window.

In a preferred embodiment, the sensor module comprises a temperature control mechanism and/or a cleaning mechanism and/or a heating mechanism and/or at least one further electrical and/or electromagnetic and/or mechatronic and/or mechanical component. Particularly preferably, the component in question is at least partially disposed in the area of the sensor module projecting in the direction of the opening center. Particularly preferably, the component in question is at least partially disposed in the projecting part of the mounting area. Preferably, the component in question may also be disposed on a roof module frame or on a part of a roof module frame and/or integrated therein at least partially or in sections. For example, a beam of the roof module frame can form part of a temperature control mechanism, in particular a channel through which an air flow can be guided in order to control the temperature of the at least one environment sensor. Heat can be transferred, for example, by a heat-conducting and/or heat transfer element which is in heat-transferring contact with the at least one environment sensor and protrudes at least partially into and/or is disposed in and/or is in heat-conducting contact with the channel. The temperature control mechanism can comprise a heat-conducting element and/or a heat sink and/or a heat exchanger and/or a heat pump and/or a metal part and/or a heat pipe. It is understood that a combination of the components listed above, i.e., not just one type of heat conducting element, can also be used. For example, part of a cleaning mechanism, in particular valves and/or fluid lines, can also be disposed and/or integrated in the roof module frame and/or on the roof module frame. Such a cleaning mechanism can comprise at least one cleaning nozzle configured to clean the see-through area of the at least one environment sensor with a cleaning fluid.

In a preferred embodiment, the roof module is attached to a vehicle body, in particular to a roof body frame, of a motor vehicle as a structural unit, in particular via a roof module frame. The roof module can form a structural unit in which features for autonomous or semi-autonomous driving supported by driver assistance systems are integrated and which is mounted on a vehicle body shell, e.g., attached to a vehicle body and/or a roof frame structure, as a unit by a vehicle manufacturer. The longitudinal rails extend essentially along the longitudinal vehicle direction of the motor vehicle. The transverse rails preferably extend in a vehicle width direction of the motor vehicle, i.e., transverse, preferably perpendicular, and essentially horizontal to the direction of travel of the motor vehicle. Preferably, the roof module can be connected, for example glued, screwed and/or bolted, to the roof frame structure of a motor vehicle via the roof module frame. The roof module can be mounted on top of or inserted into the roof frame structure, which forms part of a vehicle body. The roof module can be designed for use in a passenger car or a commercial vehicle. The roof module can preferably be provided as a structural unit in the form of a roof sensor module (RSM), in which the environment sensors and other electrical components for (partially) autonomous driving are provided. It is also conceivable that the roof module comprises one or more antenna modules and/or other electrical components. Furthermore, it is possible that the roof module comprises one or more environment sensors and/or one or more antenna modules and/or further electrical or electronic components.

In a preferred embodiment, the lid part forms a wind deflector, at least in the open position, which can be deployed by an opening movement of the lid part. The wind deflector can prevent an airstream from entering an interior of the roof opening and thus the associated generation of dynamic pressure within the vehicle interior.

The wind deflector is preferably at least partially indented in the area of a front edge of the lid part. The wind deflector preferably has a complementary or similar shape to the bulge formed by the sensor module and/or the at least one transverse and/or longitudinal beam or the part of the sensor module and/or the transverse and/or longitudinal beam protruding in the direction of the opening center.

In a preferred embodiment, the invention relates to a motor vehicle comprising at least one roof module according to any embodiment of the invention. The motor vehicle preferably comprises a vehicle body on which the roof module is disposed.

In a preferred embodiment, the vehicle body comprises at least one longitudinal and/or transverse rail, which is disposed in particular on the roof side and which delimits the roof opening at least partially at the edge and on which the sensor module is at least partially disposed and from which the sensor module protrudes in the direction of the opening center.

It will be understood that the embodiments and embodiment examples mentioned above and to be explained below can be formed not only individually but also in any combination with one another without departing from the scope of the present invention. Moreover, all embodiments and embodiment examples of the roof module relate in their entirety to a motor vehicle comprising such a roof module.

BRIEF DESCRIPTION OF THE DRAWINGS

Embodiments of the invention are schematically illustrated in the drawings and are explained below by manner of example.

FIG. 5 is a view corresponding to FIG. 4, the lid part being in an open position;

DETAILED DESCRIPTION

Figure 1:
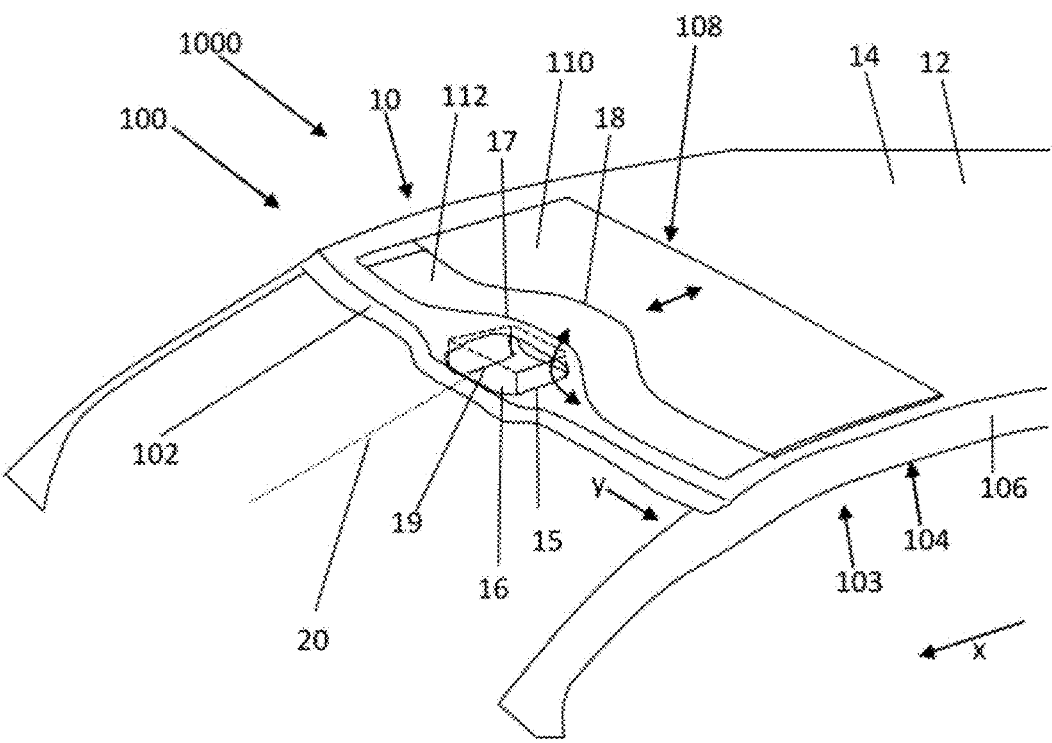
FIG. 1 is a schematic view of an embodiment example of a motor vehicle with a roof module according to the invention.

FIG. 1 shows a vehicle roof 100 of a motor vehicle 1000 (not shown in its entirety), the vehicle roof 100 being designed as a roof module 10. The roof module 10 comprises a panel component 12 for forming a roof skin 14 of the vehicle roof 100, the roof skin 14 serving as an outer sealing surface. The roof module 10 optionally comprises a roof module frame on which the panel component 12 is disposed or to which the panel component 12 is captively attached, usually glued. The roof module 10 is disposed on a roof frame structure 104 of the motor vehicle 1000, in the present case mounted on top thereof, as a structural unit. The roof frame structure 104 comprises a front-side and a rear-side transverse body rail 102, only the front-side transverse body rail 102 being visible. Furthermore, the roof frame structure 104 comprises at least two longitudinal body rails 106. In the present case, the roof frame structure 104 is part of the vehicle body 103 of the motor vehicle 1000.

The roof module 10 has a roof opening system 108, which is designed as a sliding roof system. The roof opening system 108 comprises a roof opening kinematic mechanism (not shown) and a lid part 110. The roof opening kinematic mechanism can move the lid part 110 between an at least partially open position (see FIGS. 1 and 3) and a closed position (see FIG. 2). In the at least partially open position, a roof opening 112 in the panel component 12 is open in the direction of a vehicle interior. In the closed position, the lid part 110 closes the roof opening 112 preferably in a moisture-tight manner. In the closed position, the lid part 110 is preferably flush with the roof skin 14 or the panel component 12. The lid part 110 can be made of plastic, metal or glass. A set of weather strips 114 comprising at least one weather strip, in particular a sealing strip, is preferably provided between the roof opening 112 and the lid part 110, meaning the roof opening 112 is sealed inward in a moisture-tight manner in the closed position (see FIG. 2). The set of weather strips 114 is disposed in an edge area around the roof opening 112.

During the opening of the lid part 110, the lid part 110 is lifted at least in a partial movement, in particular pivoted about a pivot axis, in order to be moved above the roof skin 14 in this manner. The lid part 110 is then moved in a rear direction, for example via a rail guide, in order to open the roof opening 112. In the open position, the lid part 110 preferably forms a wind deflector which can be deployed by the opening movement of the lid part 110.

The roof module 10 comprises at least one sensor module 15 having at least one retractable and deployable environment sensor 16. The sensor module 15 is disposed on the roof module 10 in such a manner that it projects at least partially in the direction of an opening center of the roof opening 112, thereby forming a bulge 17 or protrusion on the front-side longitudinal rail 106, in particular in a direction opposite to the direction of travel.

Figure 2:
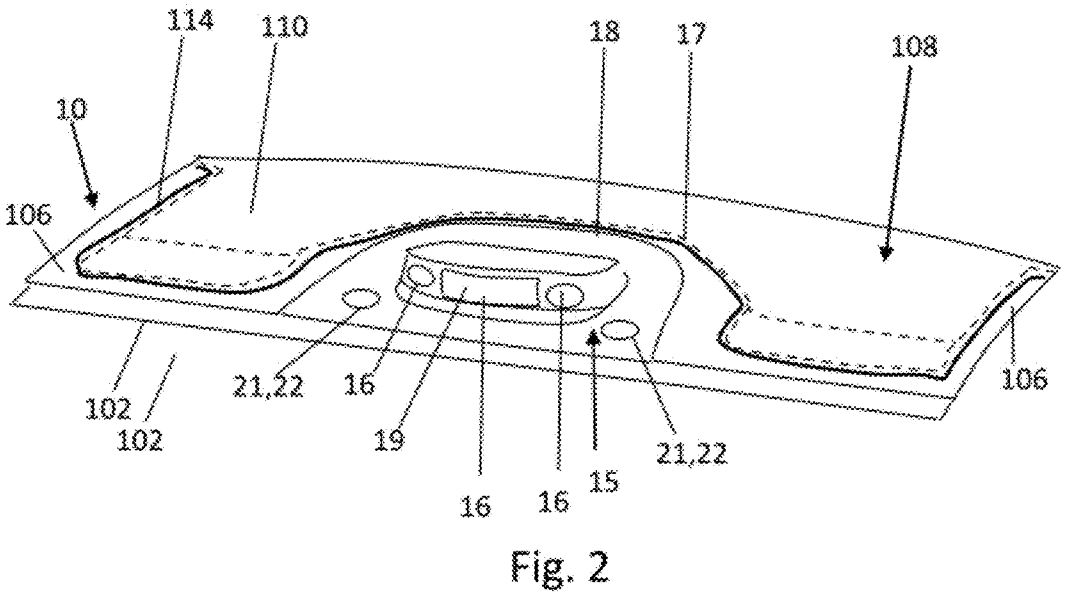
FIG. 2 is a schematic view of a section of a roof module according to the invention.
Figure 3:
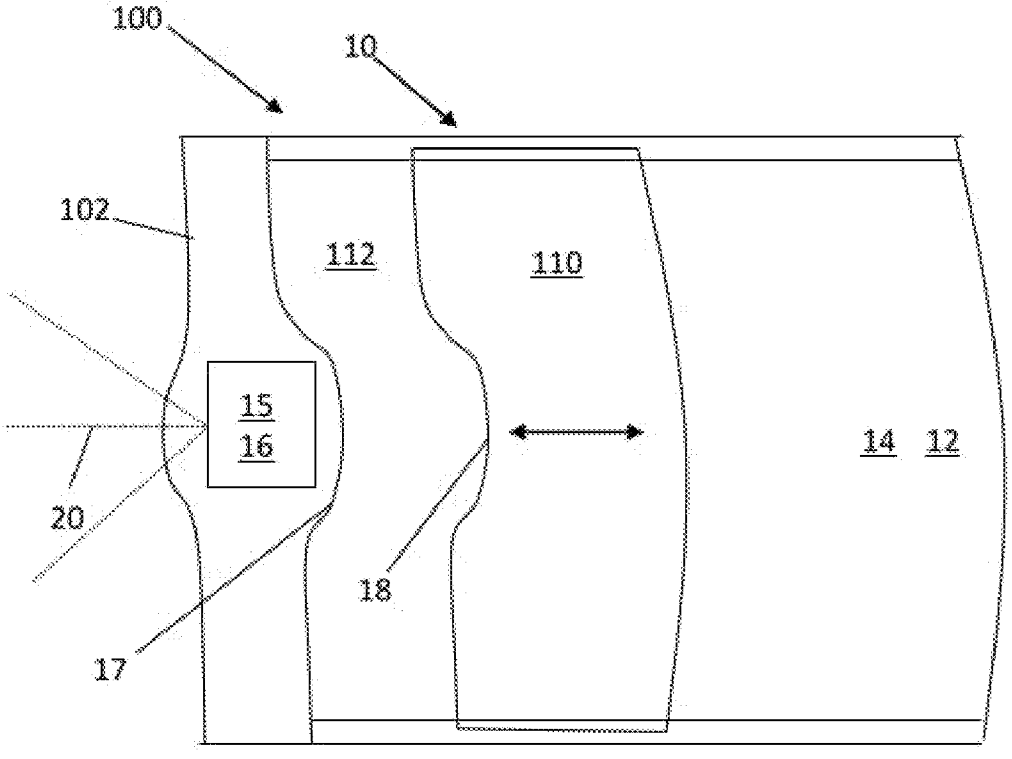
FIG. 3 is a schematic top view of a roof module according to the invention.

The lid part 110 comprises an indentation 18, which is in particular complementary to the bulge 17 and which surrounds the at least partially protruding part of the sensor module 15 when the lid part 110 is closed (see FIG. 2).

The at least one environment sensor 16 is configured to send and/or receive electromagnetic signals through a see-through area 19. In this manner, the environment sensor 16 detects a vehicle environment in the area around an optical axis 20. The sensor module 15 can comprise multiple environment sensors 16 (see FIG. 2), in particular environment sensors 16 which differ from one another. The at least one environment sensor 16 preferably comprises a lidar sensor and/or a radar sensor and/or a camera sensor and/or a multi-camera sensor and/or an ultrasonic sensor and/or a light source.

Furthermore, the sensor module 15 can comprise a temperature control mechanism and/or a cleaning mechanism 21 and/or a heating mechanism and/or at least one further electrical and/or electromagnetic and/or mechatronic and/or mechanical component. According to FIG. 2, two cleaning nozzles 22 of the cleaning mechanism 21 are shown as an example.

In some embodiments, the roof module 10 may comprise a roof module frame having at least one transverse and/or longitudinal beam which at least partially delimits the roof opening 112 at the edge. The sensor module 15 may be disposed on the roof module frame. The sensor module 15 may protrude from the roof module frame in the direction of the opening center. According to the Figures, the sensor module 15 is disposed on the front-side transverse rail 102 and forms the bulge 17 in a direction opposite to the direction of travel starting from its longitudinal extension, i.e., transverse to the longitudinal extension. At least a part of a mounting area of the sensor module 15 projects from an edge area of the roof opening 112 in such a manner that an opening cross section of the roof opening 112 is at least partially reduced in said area (see plan view of FIG. 3).

Figure 4:
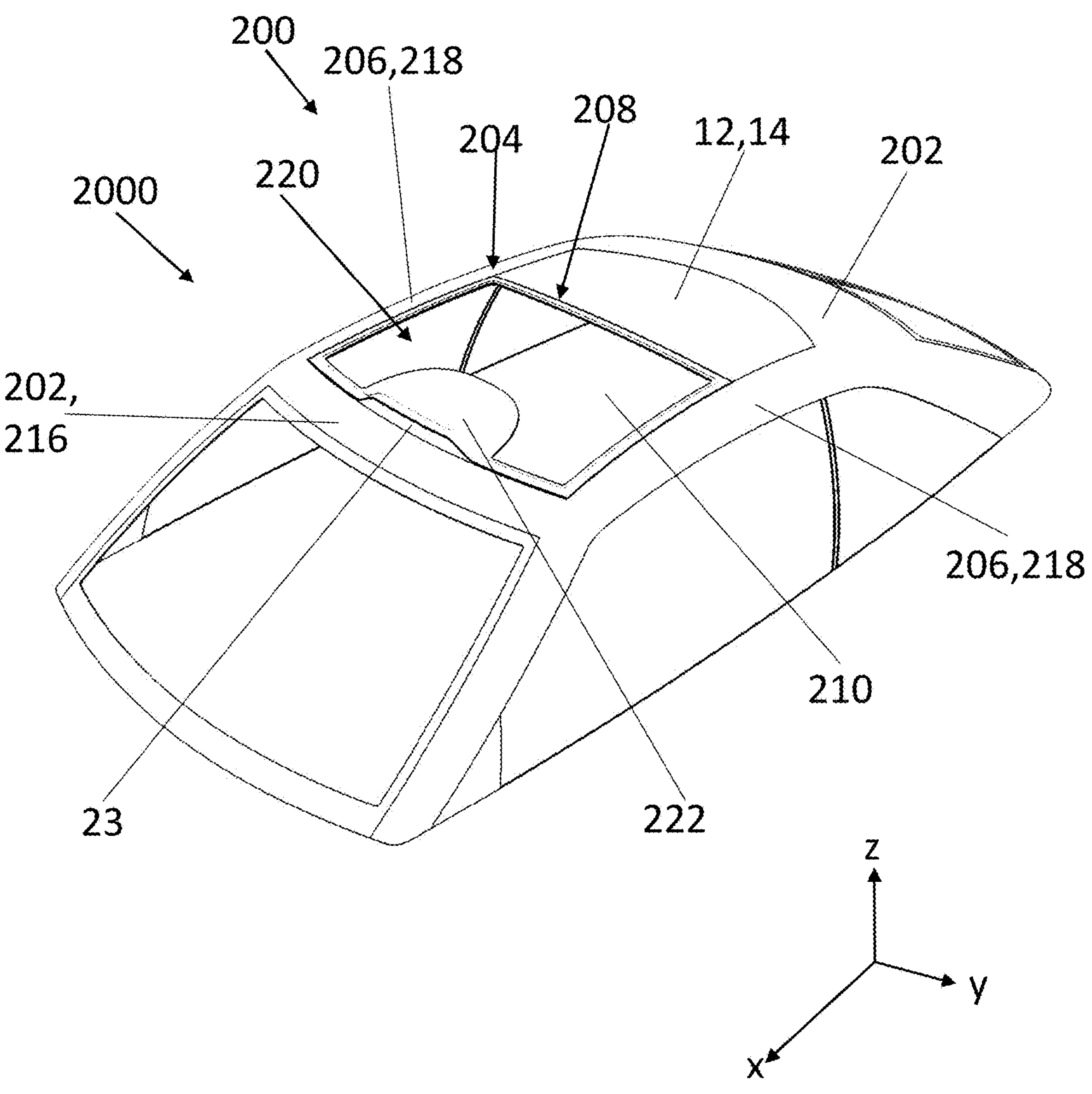
FIG. 4 is a schematic view of another embodiment example of a motor vehicle with a roof module according to the invention comprising a lid part in a closed position.
Figure 6:
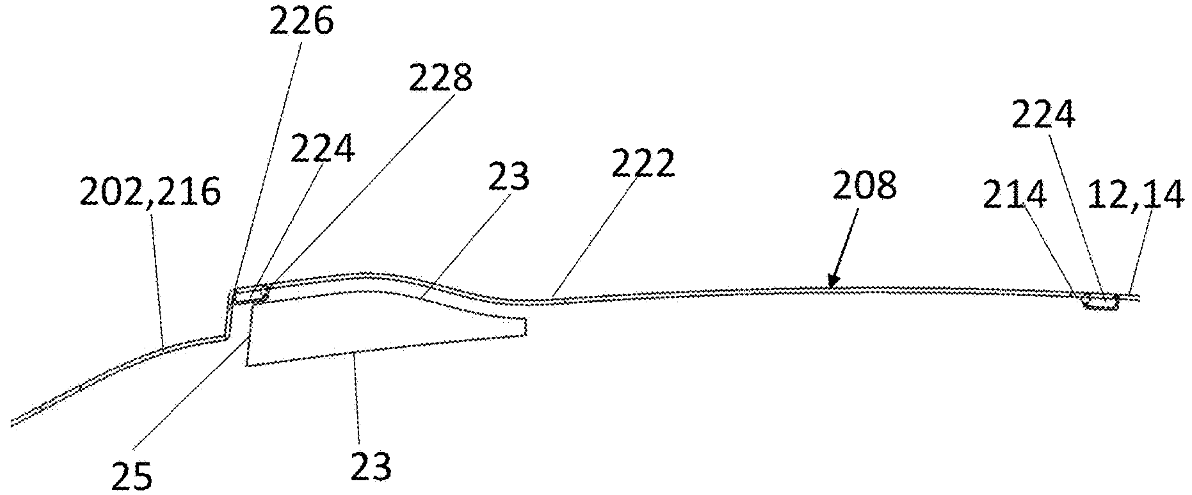
FIG. 6 is a section through the motor vehicle of FIG. 4 along a longitudinal center plane of the motor vehicle.
Figure 6:
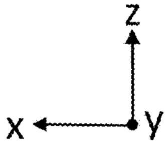

FIGS. 4 to 6 show a vehicle roof 200 of a motor vehicle 2000 (not shown in full) according to another embodiment, the vehicle roof 200 being a roof module 220.

The roof module 220 comprises a panel component 12 for forming a roof skin 14 of the vehicle roof 200, the roof skin 14 serving as an outer sealing surface, and a roof module frame on which the panel component 12 is disposed or to which the panel component 12 is captively attached, usually glued. The roof module 220 is disposed on, in the case at hand placed on top of, a roof frame structure 204 of the motor vehicle 2000 as a structural unit. The roof frame structure 204 comprises front and rear transverse body rails 202. Furthermore, the roof frame structure 204 comprises at least two longitudinal body rails 206. In the case at hand, the roof frame structure 204 is part of the vehicle body of the motor vehicle 2000. The roof module frame has two transverse beams 216 and two longitudinal beams 218, which at least partially limit the roof opening 212 at the edge.

The roof module 220 comprises a roof opening system 208, which is a sliding roof system. The roof opening system 208 comprises a roof opening kinematic system (not shown) and a lid part 210. The roof opening kinematic system is configured to move the lid part 210 between an at least partially open position (see FIG. 5) and a closed position (see FIGS. 4 and 6). In the at least partially open position, a roof opening 212 in the panel component 12 is open toward a vehicle interior. In the closed position, the lid part 210 closes the roof opening 212, preferably in a moisture-proof manner. In the closed position, the lid part 210 is preferably flush with the roof skin 14 and the panel component 12.

A sensor module 23 is disposed on the roof module frame. The sensor module 23 protrudes from the roof module frame in the direction of the opening center of the roof opening 212 and upward in the vertical vehicle direction z. The sensor module 23 is disposed on the front transverse body rail 202 or the front transverse beam 216 of the roof module frame, starting from which it forms a bulge 24 protruding into the vehicle opening 212 opposite to the direction of travel in the longitudinal vehicle direction x (see FIG. 5).

A set of weather strips 214 comprising at least one weather strip, in particular a sealing strip, is provided between the roof opening 212, in particular in an area of the roof module 220 circumferentially defining the roof opening 212, and the lid part 210. The set of weather strips 214 is disposed around the roof opening 212 in an edge area.

Furthermore, another set of weather strips 228 comprising at least one weather strip, in particular a sealing strip, is provided between the sensor module 23 and the lid part 210. The sealing strip is disposed in particular in an area of the top of the sensor module 23 located in the front with respect to the longitudinal vehicle direction x.

The set of weather strips 214 and the other set of weather strips 228 together form a continuous sealing strip. Thus, the roof opening 212 is sealed in a moisture-proof manner toward the inside when the lid part 210 is closed (see FIG. 4).

As shown in FIG. 6, a water collection groove 224 is provided, in particular circumferentially, below the set of weather strips 214 and the other set of weather strips 228.

As the lid part 210 is being opened, the lid part 210 is lifted at least in a partial movement, in particular pivoted about a pivot axis, so as to move out over the roof skin 14. Subsequently, the lid part 210 is moved in a rearward direction, for example by means of a rail guide, to open the roof opening 212. In the open position, the lid part 210 preferably forms a wind deflector configured to be deployed by the opening movement of the lid part 210.

The lid part 210 comprises a protrusion 222 protruding upward in the vertical vehicle direction z, the protrusion being in particular complementary to the geometry of the bulge 24. The protrusion 222 at least partially covers the protruding part of the sensor module 23 laterally in the vehicle width direction y, at the rear in the longitudinal vehicle direction x and at the top when the lid part 210 is closed (see FIG. 4).

The protrusion 222 is opaque. When the lid part 210 is in the closed position, the area of the sensor module 23 covered by the lid part 210 is therefore not visible. The protrusion 222 can have a patterning.

The lid part 210 further comprises a transparent window adjacent to the protrusion 222.

The sensor module 23 has at least one environment sensor configured to send and/or receive electromagnetic signals through a see-through area 25. The see-through area 25 is not covered or obstructed by the lid part 210 in any position of the lid part 210, i.e., not when the lid part 210 is in the closed position, either.

As shown in FIG. 6, a window 226 protecting the see-through area 25 from external influences may be disposed in front of the see-through area 25. The window 226 is configured in such a manner that the sensor module 23 is capable of sending and/or receiving the electromagnetic signals through the window 226. In particular, the window 226 is transparent.

When the lid part 210 is in the closed position, the lid part 210 is adjacent to the window 226 with its end located in the front with respect to the longitudinal vehicle direction x, in particular in a central area.

The at least one environment sensor preferably comprises a lidar sensor and/or a radar sensor and/or a camera sensor and/or a multi-camera sensor and/or an ultrasonic sensor and/or a light source.

Furthermore, the sensor module 23 can comprise a temperature control mechanism and/or a cleaning mechanism and/or a heating mechanism and/or at least one further electrical and/or electromagnetic and/or mechatronic and/or mechanical component.

Figure 7:
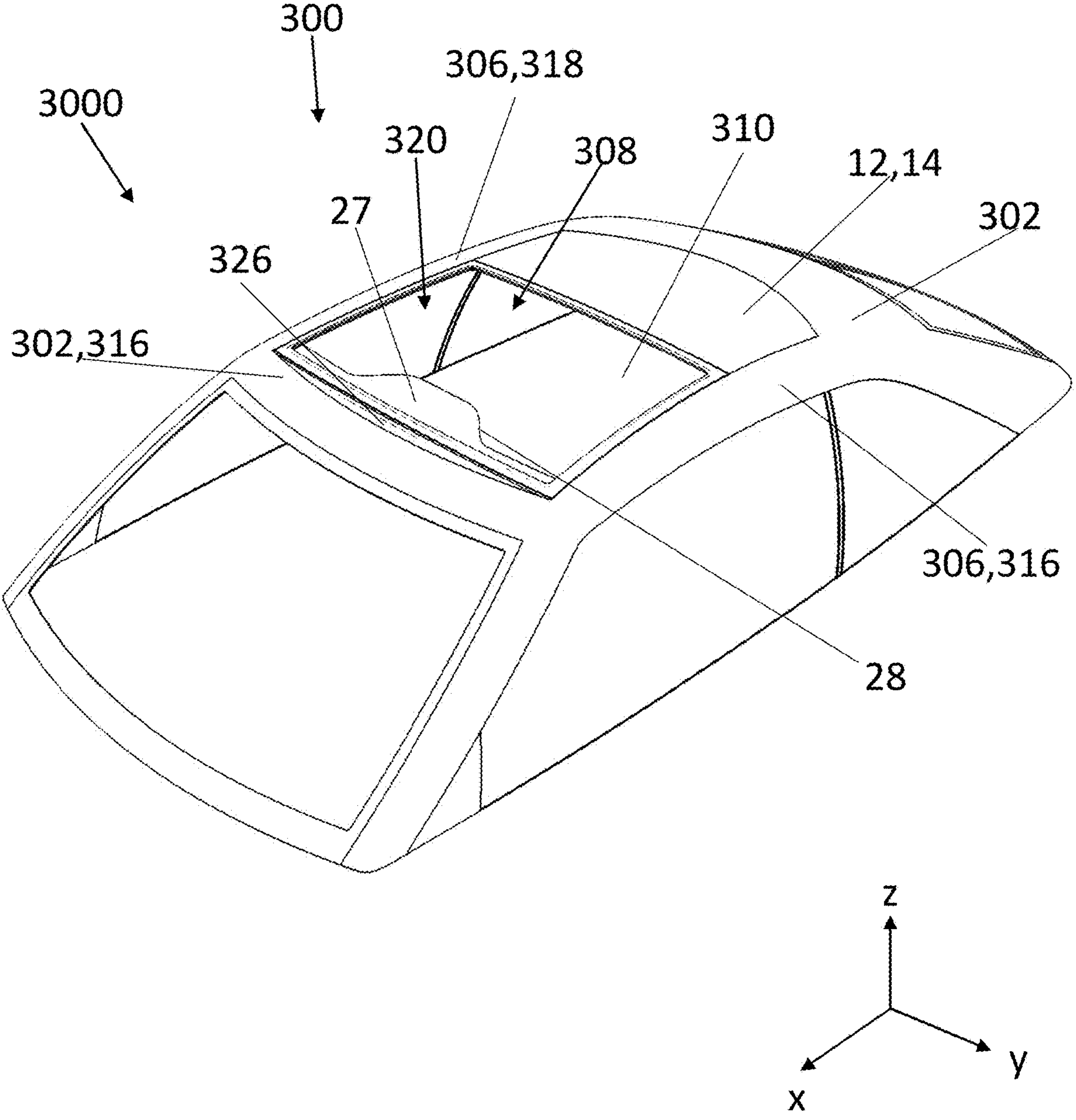
FIG. 7 is a schematic view of yet another embodiment example of a motor vehicle with a roof module according to the invention comprising a lid part in a closed position.
Figure 8:
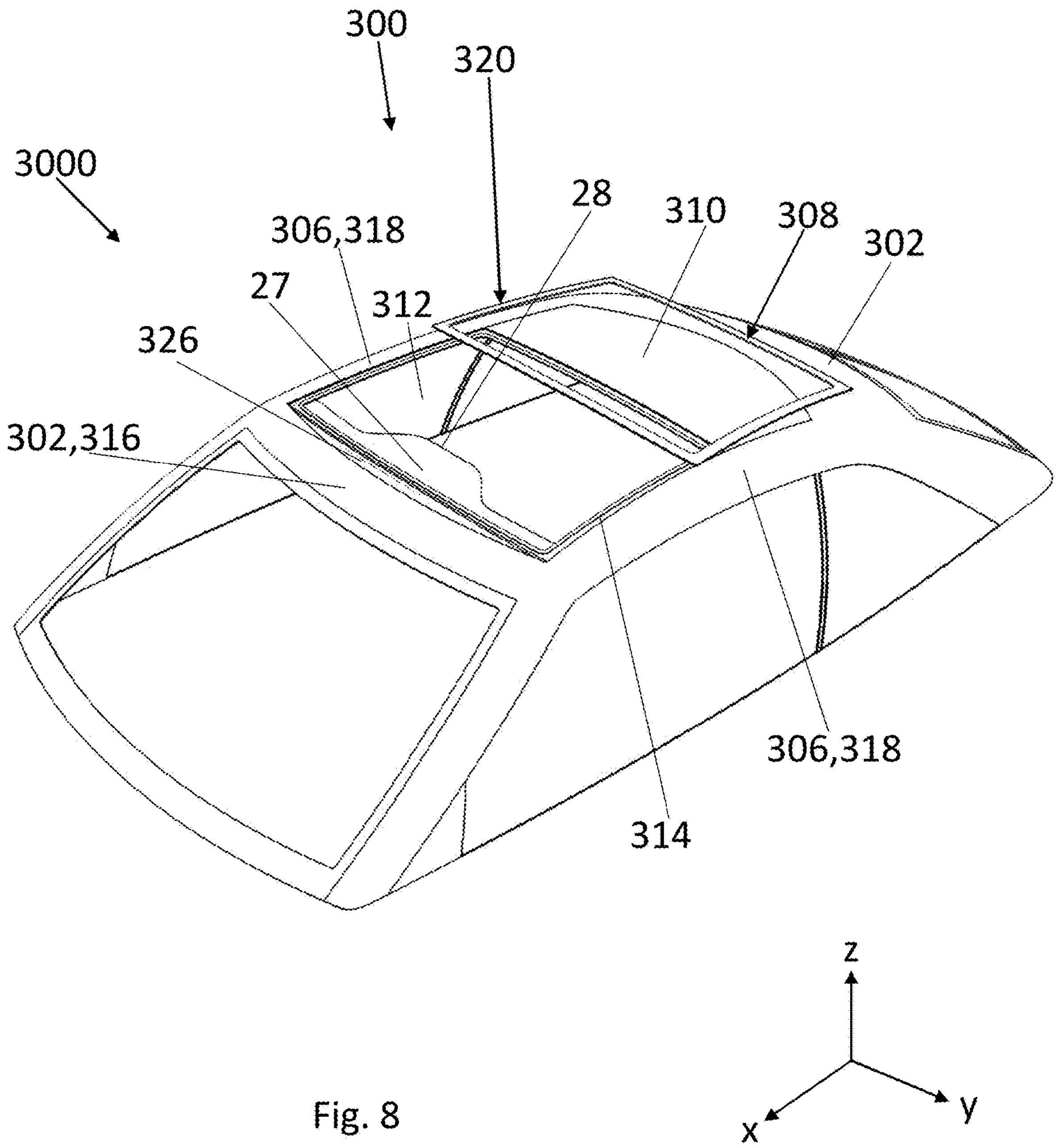
FIG. 8 is a view corresponding to FIG. 7, the lid part being in an open position.

FIGS. 7 and 8 show a vehicle roof 300 of a motor vehicle 3000 (not shown in full) according to yet another embodiment, the vehicle roof 300 being a roof module 320.

The roof module 320 comprises a panel component 12 for forming a roof skin 14 of the vehicle roof 300, the roof skin serving as an outer sealing surface. The roof module 320 further comprises a roof module frame on which the panel component 12 is disposed or to which the panel component 12 is captively attached, usually glued. The roof module frame comprises two transverse beams 316 and two longitudinal beams 318, which at least partially limit the roof opening 312 at the edge. The roof module 320 is disposed on, in the case at hand placed on top of, a roof frame structure 304 of the motor vehicle 3000 as a structural unit.

The roof frame structure 304 has front and rear transverse body rails 302. Furthermore, the roof frame structure 304 comprises at least two longitudinal body rails 306. In the case at hand, the roof frame structure 304 is part of the vehicle body of the motor vehicle 3000.

The roof module 320 comprises a roof opening system 308, which is a sliding roof system. The roof opening system 308 comprises a roof opening kinematic system (not shown) and a lid part 310. The roof opening kinematic system is configured to move the lid part 310 between an at least partially open position (see FIG. 8) and a closed position (see FIG. 7). In the at least partially open position, a roof opening 312 in the panel component 12 is open toward a vehicle interior. In the closed position, the lid part 310 closes the roof opening 312, preferably in a moisture-proof manner. In the closed position, the lid part 310 is preferably flush with the roof skin 14 and the panel component 12.

The lid part 310 comprises a transparent area, which is made of plastic or glass, for example, and which forms a window, in particular a sliding roof window.

A sensor module 27 is disposed on the roof module frame. The sensor module 27 protrudes from the roof module frame in the direction of the opening center of the roof opening 312. The sensor module 27 has at least one environment sensor. The at least one environment sensor is configured to send and/or receive electromagnetic signals through a see-through area.

The at least one environment sensor preferably comprises a lidar sensor and/or a radar sensor and/or a camera sensor and/or a multi-camera sensor and/or an ultrasonic sensor and/or a light source.

Furthermore, the sensor module 27 can comprise a temperature control mechanism and/or a cleaning mechanism and/or a heating mechanism and/or at least one further electrical and/or electromagnetic and/or mechatronic and/or mechanical component.

In the area of the sensor module 27, the roof frame module is offset downward relative to the lid part 310 in the vertical vehicle direction z, in particular when the lid part 310 is in the closed position. Thus, a gap is formed between the lid part 310 and the roof module frame. A window 326 closing the gap is disposed in the gap. The window 326 is in particular transparent.

The sensor module 27 is disposed behind the window 326 in the longitudinal vehicle direction x in such a manner that a see-through area of the at least one environment sensor is aligned with the transparent window 326 in the longitudinal vehicle direction x. Thus, the sensor module 27 is able to send and/or receive the electromagnetic signals through the window 326.

A set of weather strips 314 comprising at least one weather strip, in particular a sealing strip, is provided between the roof opening 312, in particular in an area of the roof module 320 circumferentially defining the roof opening 312, and the lid part 310. The set of weather strips 314 is disposed around the roof opening 312 in an edge area. The set of weather strips 314 forms a continuous sealing strip. Thus, the roof opening 312 is sealed in a moisture-proof manner toward the inside when the lid part 310 is closed (see FIG. 7).

As the lid part 310 is being opened, the lid part 310 is lifted at least in a partial movement, in particular pivoted about a pivot axis, so as to move out over the roof skin 14. Subsequently, the lid part 310 is moved in a rearward direction, for example by means of a rail guide, to open the roof opening 312. In the open position, the lid part 310 preferably forms a wind deflector configured to be deployed by the opening movement of the lid part 310.

REFERENCE SIGNS

10 roof module
12 panel component
14 roof skin
15 sensor module
16 environment sensor
17 bulge
18 indentation
19 see-through area
20 optical axis
21 cleaning mechanism
22 cleaning nozzle
23 sensor module
24 bulge
25 see-through area
27 sensor module
28 bulge
100 vehicle roof
102 transverse body rail
103 vehicle body
104 roof frame structure
106 longitudinal body rail
108 roof opening system
110 lid part
112 roof opening
114 set of weather strips
200 vehicle roof
202 transverse body rail
204 roof frame structure
206 longitudinal body rail
208 roof opening system
210 lid part
212 roof opening
214 set of weather strips
216 transverse beam
218 longitudinal beam
220 roof module
222 protrusion
224 water collection grove
226 transparent window
228 other set of weather strips
300 vehicle roof
302 transverse body rail
304 roof frame structure
306 longitudinal body rail
308 roof opening system
310 lid part
312 roof opening
314 set of weather strips
316 transverse beam
318 longitudinal beam
320 roof module
326 transparent window
1000 motor vehicle
2000 motor vehicle
3000 motor vehicle
x longitudinal vehicle direction
y vehicle width direction
z vertical vehicle direction

The invention claimed is:

1. A roof module for forming a vehicle roof on a motor vehicle, the roof module comprising:

a panel component which at least partially forms a roof skin of the vehicle roof, the roof skin serving as an outer sealing surface, a roof opening system having a lid part configured to selectively open and/or close a roof opening, and at least one sensor module having at least one environment sensor, the at least one sensor module being disposed on the roof module in such a manner that it at least partially protrudes in the direction of an opening center of the roof opening, wherein the lid part comprises an indentation surrounding the at least partially protruding part of the at least one sensor module when the lid part is closed, or the lid part at least partially covers the at least one sensor module when the lid part is closed.

2. The roof module according to claim 1, wherein the at least one environment sensor is retractable and deployable.

3. The roof module according to claim 1, wherein the at least one sensor module is disposed on the roof module in such a manner that it protrudes upward in a vertical vehicle direction relative to a roof module frame, the lid part comprising a protrusion whose shape corresponds to the shape of the at least one sensor module and which covers the at least one sensor module laterally and/or at the top.

4. The roof module according to claim 1, wherein the roof module comprises a roof module frame having at least one transverse and/or longitudinal beam at least partially delimiting the roof opening at the edge, the at least one sensor module being disposed on the at least one transverse and/or longitudinal beam and protruding in the direction of the opening center, upward and/or downward, and/or the at least one sensor module being disposed on the at least one transverse and/or longitudinal beam in such a manner that the at least one sensor module and the at least one transverse and/or longitudinal beam protrude in the direction of the opening center.

5. The roof module according to claim 4, wherein the at least one environment sensor is configured to send and/or receive electromagnetic signals through a see-through portion of the at least one environment sensor and a window is disposed in front of the see-through portion of the at least one environment sensor of the at least one environment sensor between the lid part and the roof module frame, the window being configured in such a manner that the at least one sensor module is configured to acquire environment data through the window.

6. The roof module according to claim 1, wherein at least part of a mounting area of the at least one sensor module projects from an edge area of the roof opening in such a manner that an opening cross section of the roof opening is at least partially reduced in the mounting area.

7. The roof module according to claim 6, wherein the indentation or the protrusion of the lid part is complementary to the projecting part of the mounting area.

8. The roof module according to claim 6, wherein the indentation or the protrusion of the lid part is complementary to the projecting part of the mounting area in terms of area.

9. The roof module according to claim 1, wherein the roof opening system comprises at least one roof opening kinematic mechanism and at least one guide rail in which the lid part is guided, in particular linearly, along the at least one guide rail to selectively open or close the roof opening and/or is movable into a partially open position and/or a tilted position.

10. The roof module according to claim 1, wherein the at least one environment sensor is configured to send and/or receive electromagnetic signals through a see-through portion of the at least one environment sensor.

11. The roof module according to claim 1, wherein the at least one environment sensor comprises a lidar sensor and/or a radar sensor and/or a camera sensor and/or a multi-camera sensor and/or an ultrasonic sensor and/or a light source.

12. The roof module according to claim 1, wherein the at least one sensor module comprises at least one of a temperature control mechanism, a cleaning mechanism, a heating mechanism, and at least one of an another electrical, electromagnetic, mechatronic, and mechanical component.

13. The roof module according to claim 1, wherein the roof module is disposed on a vehicle body as a structural unit.

14. The roof module according to claim 1, wherein the lid part forms a wind deflector at least in the open position, the wind deflector being configured to be deployed by an opening movement of the lid part.

15. A motor vehicle having a vehicle body, the motor vehicle comprising a roof module according to claim 1, the roof module being disposed on the vehicle body.

16. The motor vehicle according to claim 15, wherein the vehicle body comprises at least one longitudinal and/or transverse rail, which at least partially delimits the roof opening at the edge and on which the at least one sensor module is at least partially disposed and from which the at least one sensor module protrudes in the direction of the opening center and/or upward and/or downward in the vertical vehicle direction.

17. The motor vehicle according to claim 15, wherein the vehicle body comprises at least one longitudinal and/or transverse rail, which at least partially delimits the roof opening at the edge and on which the at least one sensor module is at least partially disposed and from which the at least one sensor module protrudes in the direction of the opening center and/or upward and/or downward in the vertical vehicle direction.

18. The roof module according to claim 1, wherein the roof opening system comprises at least one roof opening kinematic mechanism and at least one guide rail in which the lid part is guided linearly along the at least one guide rail to selectively open or close the roof opening and/or is movable into a partially open position and/or a tilted position.

19. The roof module according to claim 1, wherein the roof module is disposed on a roof frame structure of the vehicle body of a motor vehicle, as a structural unit.

* * * * *